Figure 1:
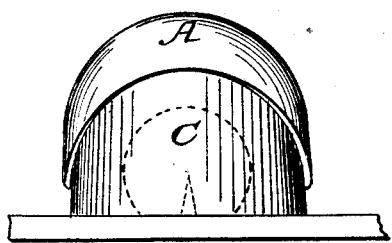

H. B. GOODYEAR.
Rubber Articles.

No. 30,675. Patented Nov. 20, 1860.

Witnesses
P. E. Wilson
J. M. Gordon

Inventor.
Henry B. Goodyear
by A. Blake

UNITED STATES PATENT OFFICE.

HENRY B. GOODYEAR, OF NEW HAVEN, CONNECTICUT.

VULCANIZING INDIA-RUBBER TIPS FOR SHOES.

Specification of Letters Patent No. 30,675, dated November 20, 1860.

*To all whom it may concern:*

Be it known that I, HENRY B. GOODYEAR, of New Haven, in the county of New Haven and State of Connecticut, have invented a new and useful Improvement in Vulcanizing Boot and Shoe Tips Made of India-Rubber, Gutta-Percha, and Their Compounds or Equivalents; and I do hereby declare that the following, taken in connection with the accompanying drawing, that forms part of this specification, is such a full and clear description as to enable others skilled in the art to which this my invention pertains to make and use the same.

As for the purposes of explanation, and to avoid complication, it will here suffice to describe my invention as applied to the manufacture of india-rubber tips having united with them a boot or shoe sole or web piece of suitable textile fabric for sewing or joining the tip to the sole or upper as made the subject of a separate application for Letters Patent, a few preliminary remarks will suffice to make clear the object of this my present invention.

It is well known that india rubber in its plastic state used for molding into articles of various kinds is of a soft pasty character, very susceptible to impression and alteration of shape, and that it is only by vulcanizing or hermizing the rubber goods in or on the molds that a permanently elastic nature and capacity to retain the form given to them by the molds is imparted to said articles. In such goods of a shape that admit of being end-bound in different directions or braced or surrounded by the molds so that there will be but little or no disposition for them to warp, draw-off the molds or have their shape and uniform or other given thickness changed during the hermizing process or by the application of heat in effecting their vulcanization, but little skill is required to secure perfect molding of them. But there are other description of goods which it is extremely difficult to provide for or against these liabilities to warp, alteration of shape and thickness, and no instance is this more conspicuous than in the manufacture of india-rubber tips for boots and shoes. This will be self evident when we consider the taper form of a shoe tip and its slight hold upon the mold used to form it and the fact that not being end-bound or sustained at the back as at the toe, it readily draws from the mold, warps and so forth, while it is all important to make a good fitting tip to the shoe and one that shall present no bumps or irregularities in thickness at the toe, that these objectionable tendencies should be counteracted and to do so effectually in a simple manner is one of the objects of my invention. Furthermore in the manufacture of rubber such as boot and shoe tips, in large quantities say at the rate of thousands in a day, aught that economizes material or labor and facilitates production is, when applied to bulk of great importance. Thus to use wooden or other shoe lasts corresponding to the whole foot as molds whereon to form at their ends the rubber tips is both expensive and inconvenient inasmuch as such lasts are comparatively costly, occupy much space and present no ready means for keeping them from slipping and in place when transfering them to the heater for vulcanizing the tips. In these respects also my present invention effects a great improvement.

The following description will explain the nature and principles of my invention and how the same is or may be carried into practice.

Figure 2:
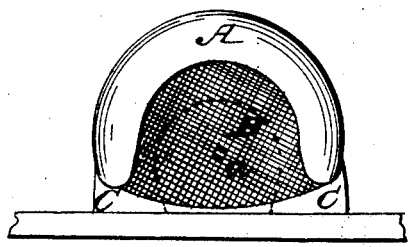
Figure 3:
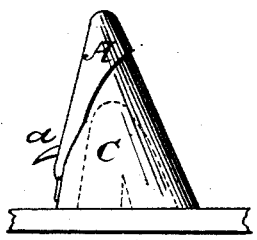
Figure 4:
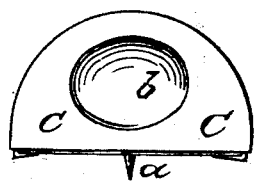

In the accompanying drawings, Figure 1 represents a front view of a tip form or mold constructed according to my improvement with a shoe tip secured to it; Fig. 2 a back and Fig. 3 a side view of the same, and Fig. 4 a plan view thereof inverted.

The part marked A indicates the rubber tip and B the web or sole to which it is united.

C is a form or mold corresponding to the toe part of the shoe and on which the tip is formed and held by placing it over and on the front end of the mold with the sole or web piece (B) against the under side of the latter and hitching said web piece on to a hook (*a*) provided the mold on its under side or face and which hook serves to hold the tip securely to its place and to prevent its drawing off or warping or changing its shape or thickness when transferring the plastic rubber tip to the heater to be vulcanized and during its vulcanization. This mold (C) is, in contradistinction to a "last," solely a tip former and is in itself a molded production being cast of metal or other suitable material in a matrix or mold formed by a pattern corresponding to it so that the one pattern serves at a cheap rate to make any number of tip formers to manufacture simultaneously a large quantity of tips and as such a tip former need present no surplus surface as would a "last," material and space are economized. But this is not all. Said molded tip former (C) I cast hollow which not merely reduces weight and material but, by the cavity (b) formed in it serves to admit of it with the tip thereon and hooked or secured thereto being readily held in place while transferring it to the heater and during the process of vulcanization by making the platform or tray which is used to carry the molds and their tips with a series of pins or projections on to which the tip formers (C) in any suitable numbers may by their cavity (b) be placed and which will serve to keep the molds and tips from slipping and at a suitable distance from each other to perfect vulcanization of the tips, and generally facilitate the manufacture of said articles. If preferred the tray may be formed with holes and the tip formers with pins to fit into them instead, which of course would be the equivalent.

After vulcanization the tip formers are lifted from the pinned connection with the tray and the tips taken from the formers by unhitching their soles or webs (B) from the hooks (a) and drawing the tips off the front end of the formers.

Such process and construction of appliances for manufacturing india rubber boot and shoe tips largely economizes labor, cheapens production and makes a more regular and perfect article. Such a process too is equally applicable to the manufacture of many other articles made of india rubber, gutta percha or their compounds or equivalents in which the same or like difficulties and requirements have to be met.

And now having described my invention, I claim—

1. The employment of a cast tip mold or former made hollow or otherwise equivalently constructed to establish a pinned connection of it with the tray or platform which serves to carry the molds and tips substantially as specified.

2. Providing the tip mold or former with a hook or pin on to which the tip may be hitched and which serves to keep the tip to its place on the mold essentially as herein set forth.

3. In the vulcanizing of india rubber shoe tips or other like articles the process herein described of holding the tips to their places and the molds in their position substantially as specified.

In testimony whereof I have signed my name to this specification before two subscribing witnesses.

H. B. GOODYEAR.

Witnesses:
J. M. AUGUR,
W. L. MORRELL.